US012564862B2

(12) United States Patent
Zhao et al.

(10) Patent No.: US 12,564,862 B2
(45) Date of Patent: Mar. 3, 2026

(54) ULTRAVIOLET LIGHTING SYSTEMS WITH OPTICAL CABLES FOR CURING PAINT

(71) Applicant: GM GLOBAL TECHNOLOGY OPERATIONS LLC, Detroit, MI (US)

(72) Inventors: Xiang Zhao, Novi, MI (US); Hua-Tzu Fan, Troy, MI (US); Marcel James Isrow, Bruce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 181 days.

(21) Appl. No.: 18/451,906

(22) Filed: Aug. 18, 2023

(65) Prior Publication Data

US 2025/0058350 A1 Feb. 20, 2025

(51) Int. Cl.
| | |
|---|---|
| *B05D 3/06* | (2006.01) |
| *B25J 11/00* | (2006.01) |
| *B25J 18/00* | (2006.01) |
| *B25J 5/00* | (2006.01) |

(52) U.S. Cl.
CPC .......... *B05D 3/067* (2013.01); *B25J 11/0075* (2013.01); *B25J 18/002* (2013.01); *B25J 5/007* (2013.01)

(58) Field of Classification Search
CPC ..... B05D 3/067; B25J 11/0075; B25J 18/002; B25J 5/007; B25J 11/00; B25J 19/0037
See application file for complete search history.

(56) References Cited

U.S. PATENT DOCUMENTS

| | | | | |
|---|---|---|---|---|
| 5,302,999 A | * | 4/1994 | Oshida | G02B 6/04 |
| | | | | 355/1 |
| 2019/0128802 A1 | * | 5/2019 | Adams | G01B 11/0625 |

| | | | | |
|---|---|---|---|---|
| 2019/0134974 A1 | * | 5/2019 | Yu | F26B 3/283 |
| 2021/0347048 A1 | * | 11/2021 | Trevor | B25J 9/1664 |
| 2021/0349462 A1 | * | 11/2021 | Jules | G05D 1/249 |
| 2023/0310683 A1 | * | 10/2023 | Lee | B25J 9/16 |
| | | | | 250/492.1 |
| 2024/0207475 A1 | * | 6/2024 | Kaler | A61L 9/20 |

FOREIGN PATENT DOCUMENTS

| | | |
|---|---|---|
| DE | 4301716 A1 | 8/1993 |
| DE | 102010013342 A1 | 10/2011 |
| DE | 102018102527 A1 | 8/2019 |

OTHER PUBLICATIONS

U.S. Appl. No. 17/970,096, filed Oct. 20, 2022, Zhao et al.
U.S. Appl. No. 18/095,423, filed Jan. 10, 2023, Zhao et al.
U.S. Appl. No. 18/095,432, filed Jan. 10, 2023, Fan et al.
U.S. Appl. No. 18/322,260, filed May 23, 2023, Spicer et al.
Office Action dated Apr. 16, 2024 from German Patent Office for German Patent No. 102023133114.0; 5pgs.

* cited by examiner

*Primary Examiner* — Nhi Q Bui

(57) ABSTRACT

A robotic system includes a robot arm including a first end and a second end opposing the first end, an optical cable extending between the first end and the second end of the robot arm, a lamp assembly disposed at the second end of the robot arm, the lamp assembly including a lamp holder having a plurality of ultraviolet (UV) lamps configured to cure paint, and a control module. The control module is configured to actuate the lamp holder and position one or more selected UV lamps of the plurality of UV lamps in communication with an end of the optical cable, and turn on the one or more selected UV lamps to transmit UV light through the optical cable to cure paint on a panel of a vehicle. Other examples charging robotic systems and methods are also disclosed.

20 Claims, 4 Drawing Sheets

ULTRAVIOLET LIGHTING SYSTEMS WITH OPTICAL CABLES FOR CURING PAINT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to lighting systems for curing paint, and more particularly to ultraviolet lighting systems with optical cables for curing paint.

During manufacture of a vehicle, paint may be applied to panels of the vehicle. More specifically, paint may be applied to an exterior surface and an interior surface of the panel. Examples of such panels include a door frame, a fuel door, and a liftgate of the vehicle. Various types of paint may be used. One type of paint is curable paint.

SUMMARY

A robotic system includes a robot arm including a first end and a second end opposing the first end, an optical cable extending between the first end and the second end of the robot arm, a lamp assembly disposed at the second end of the robot arm, the lamp assembly including a lamp holder having a plurality of ultraviolet (UV) lamps configured to cure paint, and a control module. The control module is configured to actuate the lamp holder and position one or more selected UV lamps of the plurality of UV lamps in communication with an end of the optical cable, and turn on the one or more selected UV lamps to transmit UV light through the optical cable to cure paint on a panel of a vehicle.

In other features, the lamp holder includes a wheel having an outer circumference, and the plurality of UV lamps are disposed along the outer circumference of the wheel.

In other features, the control module is configured to rotate the wheel and position the one or more selected UV lamps in communication with the end of the optical cable.

In other features, the plurality of UV lamps includes eight UV lamps disposed along the outer circumference of the wheel.

In other features, the lamp assembly includes a mirror or a lens disposed between the one or more selected UV lamps and the optical cable.

In other features, the lamp assembly includes one or more mirrors and one or more lens disposed between the one or more selected UV lamps and the optical cable.

In other features, the one or more mirrors include a one-way mirror.

In other features, the robotic system further includes an end closure disposed at the first end of the robot arm, the end closure configured to adjust the UV light from the one or more selected UV lamps.

In other features, the end closure includes at least one glass lens configured to focus the UV light from the one or more selected UV lamps, and the optical cable is configured to transmit the UV light from the one or more selected UV lamps to the at least one glass lens in the end closure.

In other features, each of the plurality of UV lamps have a different light output wavelength.

In other features, the plurality of UV lamps includes UV LED lamps.

In other features, the control module is configured to actuate the robot arm and position the first end of the robot arm relative to the panel of the vehicle.

In other features, the robotic system further includes a movable base disposed under the robot arm and wherein the control module is configured to actuate the movable base and position the robot arm relative to the panel of the vehicle.

In other features, the control module is configured to set a UV light exposure time and turn off the one or more selected UV lamps when the UV light exposure time is met.

A robotic system includes a robot arm including a first end, a second end opposing the first end, an optical cable extending between the first end and the second end of the robot arm, a lamp assembly disposed at the second end of the robot arm, the lamp assembly including a plurality of ultraviolet (UV) lamps configured to cure paint, at least one one-way mirror disposed between the plurality UV lamps, and a lens disposed between each UV lamp of the plurality UV lamps and the one-way mirror, and a control module. The control module is configured to turn on one or more selected UV lamps of the plurality UV lamps to transmit UV light through the lens disposed between the one or more selected UV lamps and the one-way mirror, through the one-way mirror, and through the optical cable to cure paint on a panel of a vehicle.

In other features, the plurality UV lamps includes a UV-A LED lamp, a UV-B LED lamp, and a UV-C LED lamp.

In other features, the lens disposed between each UV lamp of the plurality UV lamps are first lens, and the lamp assembly includes at least one second lens disposed between the one-way mirror and an end of the optical cable.

In other features, the robotic system further includes an end closure disposed at the first end of the robot arm. The end closure includes at least one glass lens configured to focus the UV light from the one or more selected UV lamps, and the optical cable is configured to transmit the UV light from the one or more selected UV lamps to the at least one glass lens in the end closure.

In other features, the control module is configured to actuate the robot arm and position the first end of the robot arm relative to the panel of the vehicle.

In other features, the robotic system further includes a movable base disposed under the robot arm and wherein the control module is configured to actuate the movable base and position the robot arm relative to the panel of the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Curable paint may be applied to panels of a vehicle during or after the manufacture process of the vehicle. Once applied, an ultraviolet (UV) lighting system can cure the paint by providing UV light to the paint. Conventional UV lighting systems use UV lamps with a single, specific wavelength range, such as UV-A (about 315 nm to about 400 nm) or UV-B (about 280 nm to about 315 nm) or UV-C (about 100 nm to about 280 nm). However, in many cases, UV paints having different depths or pigments may be used on the vehicle. Therefore, to cure the different UV paints, a user is required exchange UV lamps in an existing UV lighting system with alternate UV lamps having different wavelengths or use multiple UV lighting systems having UV lamps with different wavelengths. As a result of using alternate UV lamps and/or multiple UV lighting systems, assembly line cycle times and/or equipment costs undesirably increase.

The robotic systems according to the present disclosure provide solutions for employing a UV lighting system having a lamp holder with multiple different UV lamps for curing paint. For example, the robotic systems include a robot arm, an optical cable extending along the robot arm, a lamp assembly having multiple UV lamps, and a control module for turning on one or more selected UV lamps to transmit UV light through the optical cable to cure paint on a panel of a vehicle. In such examples, the systems may transmit UV light in various UV light wavelengths and intensities for curing UV paint having different depths or pigments. As such, by employing the robotic systems herein, productivity and flexibility is increased and overall equipment cost is reduced as compared to conventional single wavelength UV lighting systems by eliminating the time needed to exchange UV lamps with different UV light wavelength and eliminating the reliance on multiple UV lighting systems.

Figure 1:
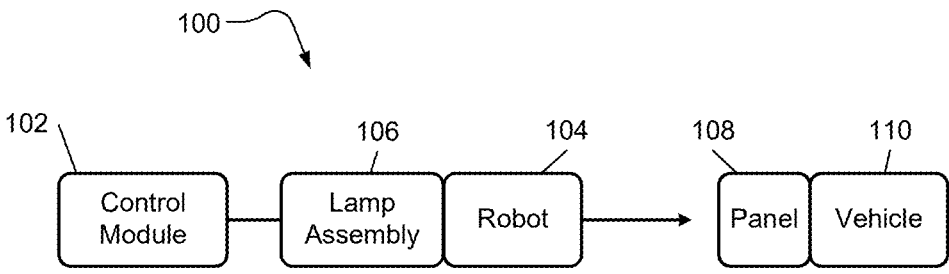
FIG. 1 is a functional block diagram of an example robotic system for curing paint on a panel of a vehicle according to the present disclosure.

Referring now to FIG. 1, a block diagram of an example robotic system 100 is presented for curing paint on one or more panels of a vehicle. While the robotic system 100 of FIG. 1 and/or other robotic systems herein are described with respect to curing paint on a vehicle, it should be appreciated that any one the robotic systems herein may be applicable for curing paint on non-vehicle implementations. For example, the robotic systems may be applicable for curing paint on aircrafts, boats, and/or any other suitable object.

As shown in FIG. 1, the robotic system 100 generally includes a control module 102, a robot 104, and a lamp assembly 106. The lamp assembly 106 may be disposed adjacent to and in some examples mounted to the robot 104. In the example of FIG. 1, the lamp assembly 106 includes multiple UV lamps, such as UV light emitting diode (LED) lamps, etc. Any one or more of the UV lamps may be activated to transmit UV light (e.g., UV radiation) through an optical cable (not shown) to cure paint on a panel 108 of a vehicle 110.

The panel 108 of the vehicle 110 may be any suitable panel. For example, the panel 108 may be an interior panel of the vehicle 110 or an exterior panel of the vehicle 110. In some examples, the panel 108 may be a swinging panel that is movable between an open position and a closed position, such as a liftgate, door, or hood. In other examples, the panel 108 may be a non-swinging (e.g., fixed) panel.

In various embodiments, the control module 102 controls the lamp assembly 106 to position one or more selected UV lamps in the lamp assembly 106 in communication with the optical cable. For example, and as further explained herein, the control module 102 may rotate or otherwise move the lamp assembly 106 to align one or more selected UV lamps with an opening (e.g., an inlet) of the optical cable. After the panel 108 of the vehicle 110 is painted using curable paint (e.g., UV curable paint), the control module 102 activates (e.g., turns on, etc.) the one or more selected UV lamps of the lamp assembly 106. Then, UV light from the UV lamps passes through the optical cable and is directed towards the panel 108 of the vehicle 110.

Additionally, in some examples, the control module 102 may operate the robot 104. For example, the control module 102 may control movement of a robotic arm of the robot 104 and/or movement of the robot 104. In such examples, the control module 102 may actuate the robotic arm and/or actuate a movable base of the robot 104 to position an end of the robot arm in a desired location relative to the panel 108 of the vehicle 110. For instance, the control module 102 may move the robot 104 (e.g., the robotic arm, the movable base, etc.) such that the UV light may reach all target areas of the panel 108.

Further, the control module 102 may control parameters of the UV lamps. For example, and as further explained below, the control module 102 may control a frequency of the UV lamps, an intensity of the UV lamps, a duration of time that the UV lamps are on, etc.

Figure 2:
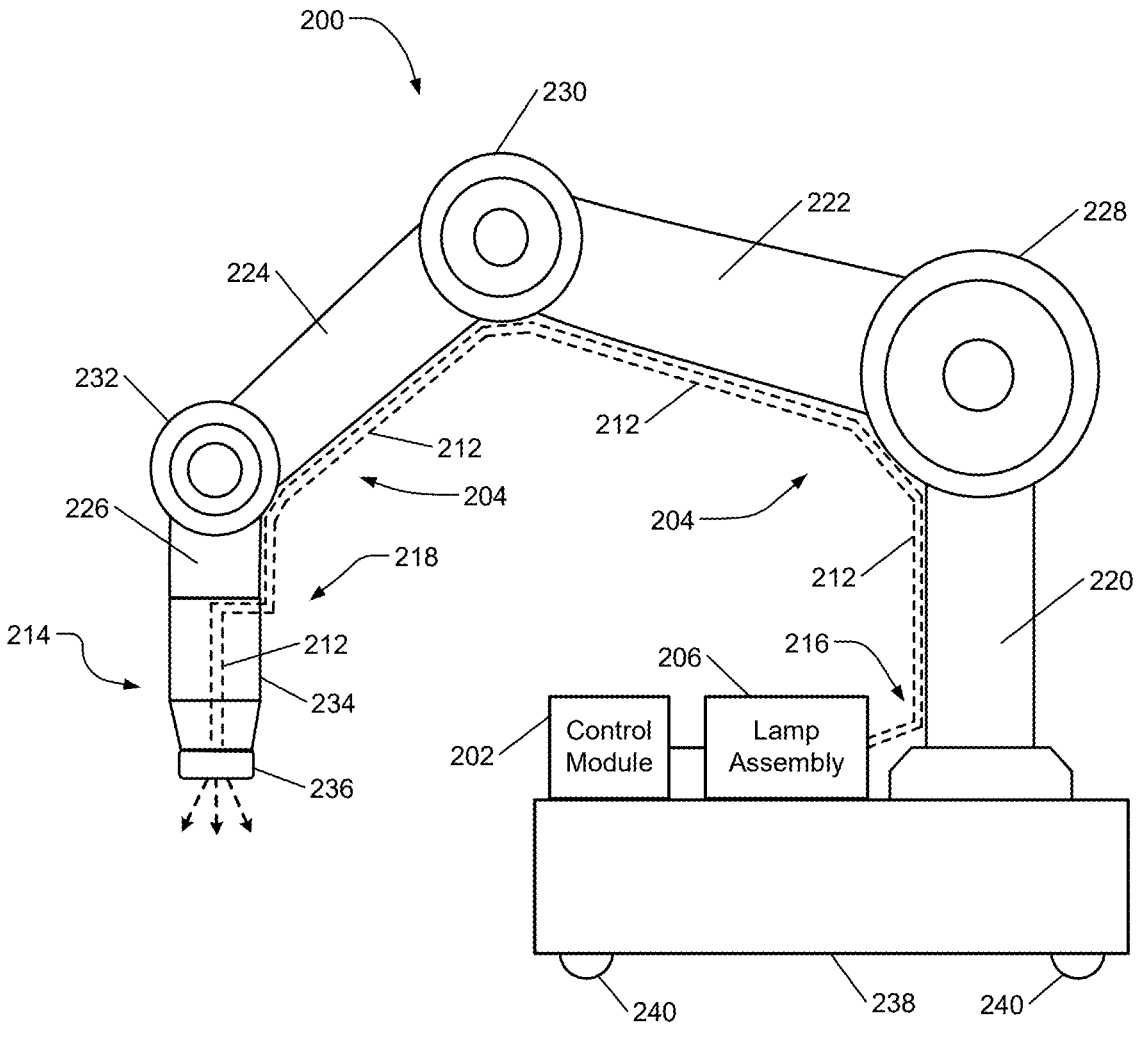
FIG. 2 is a side view of another example robotic system for curing paint according to the present disclosure.

FIG. 2 is a side view of an example robotic system 200 for curing paint on one or more panels of a vehicle and/or another suitable object. In various embodiments, the robotic system 200 may be considered a portable, self-contained UV lighting system. As shown in FIG. 2, the robotic system 200 includes a robot arm 204, an optical cable 212, a lamp assembly 206, an end closure (e.g., a light applicator) 214, a base 238, and a control module 202. The robot arm 204 includes opposing ends 216, 218, and the optical cable 212 generally extends between the ends 216, 218 of the robot arm 204. In the example of FIG. 2, the lamp assembly 206 is disposed at (e.g., adjacent to) the end 216 of the robot arm 204 and is in communication with an end (e.g., an inlet) of the optical cable 212. In other examples, the lamp assembly 206 and/or the optical cable 212 may be positioned in other suitable locations. For example, the lamp assembly 206 may be located near the end 218 of the robot arm 204 and in communication with the optical cable 212 or the lamp assembly 206 may be remote from the robot arm 204 and in communication with the optical cable 212.

In the example of FIG. 2, the robot arm 204 generally includes multiple arm segments 220, 222, 224, 226 and multiple actuators (e.g., motors, etc.) 228, 230, 232. The arm segment 226 is coupled with the end closure (e.g., the light applicator) 214 at the end 218 of the robot arm 204, and the arm segment 220 is coupled with the base 238. Additionally, each actuator 228, 230, 232 is connected between two adjacent arm segments 220, 222, 224, 226. While the robot arm 204 of FIG. 2 is shown as including four arm segments 220, 222, 224, 226 and three actuators 228, 230, 232, it should be appreciated that the robot arm 204 may include more or less arm segments and/or actuators as desired.

The base 238 generally supports other components of the robotic system 200. For example, and as shown in FIG. 2, the robot arm 204, the lamp assembly 206 and the control module 202 are mounted to a top side of the base 238. In other examples, the lamp assembly 206 and/or the control module 202 may be mounted in another location remote from the base 238 if desired.

Additionally, the base 238 may be movable. For example, and as shown in FIG. 2, the base 238 includes wheels 240 for enabling movement of the base 238 to a desired location. In such examples, movement of the base 238 may be manually controlled by one or more individuals (e.g., pushing, pulling, etc. the base 238, the robot arm 204, etc.) and/or controlled by the control module 202 as further explained herein. In either case, movement of the base 238 allows the system 200 (and more particularly the end 218 of the robot arm 204, the end closure 214, etc.) to be positioned near different panels of the vehicle as desired. In other examples, the base 238 may be stationary. In such examples, the wheels 240 are omitted and the base 238 (without the wheels) may be mounted on the ground.

In various embodiments, the lamp assembly 206 generally includes multiple UV lamps for curing paint when one or more of the lamps are turned on (e.g., activated). For example, and as further explained herein, the lamp assembly 206 may include a structure (e.g., a lamp holder) for holding multiple UV lamps. In such examples, any one or more of the UV lamps may be selected and positioned near an open end or an inlet of the optical cable (e.g., a fiber optic cable) 212 at the end 216 of the robot arm 204. In some examples, the lamp holder or another suitable structure may be manually and/or electronically actuated (e.g., rotated, moved, etc.) to move desirable UV lamp(s) near the open end of the optical cable 212. Then, when activated, the selected UV lamp(s) transmit UV light through the optical cable 212 and towards the end closure 214 at the opposing end or an outlet of the optical cable 212 (e.g., near the end 218 of the robot arm 204). In some examples, the lamp assembly 206 may include one or more lens and/or mirrors for focusing (or defocusing), redirecting, etc. the UV light provided by the selected UV lamp(s) as further explained below.

The end closure 214 is generally disposed at the end 218 of the robot arm 204. In various embodiments, the end closure 214 may be a compact-size light applicator mounted on the robotic arm 204 for shining UV light on cramped areas of a vehicle's interior surfaces, such as door or liftgate hinge areas, underneath door frame surfaces, etc.

In the example of FIG. 2, the end closure 214 includes a housing 234 and a glass lens 236 positioned near a light output of the robotic system 200. As shown, the optical cable 212 transmits UV light from one or more selected UV lamps to the glass lens 236 in the end closure 214. In such examples, the end closure 214 may adjust the UV light. For example, the glass lens 236 of the end closure 214 may focus or defocus the UV light from the selected UV lamp(s) as the UV light passes through the end closure 214 and out of the end closure 214.

The end closure 214 may also provide protection for components of the robotic system 200. For example, the end closure 214 may prevent debris and/or other undesirable objects from getting into the optical cable 212 and/or otherwise obstructing UV light from exiting the optical cable 212 and passing through the glass lens 236.

In various embodiments, the robot arm 204 may be movable for accessing different panels of the vehicle and/or hard to reach areas of panels, such as door or liftgate hinge areas, underneath door frame surfaces, etc. More particularly, the robot arm 204 may be manually controlled by one or more individuals (e.g., manually pushing, pulling, etc. the robot arm 204, etc.) and/or electronically controlled. For example, the actuators 228, 230, 232 may be controlled to move the end closure 214 to a desired location relative to a vehicle panel (or another suitable object). For example, the actuators 228, 230, 232 may function as controllable joints to move their associated arm segments 222, 224, 226. Additionally, in some examples, the arm segment 220 may swing (e.g., rotate) about a connection point with the base 238. With such available movements of the arm segments 220, 222, 224, 226, the end 218 of the robot arm 204 (and the end closure 214 connected to the robot arm 204) may be able to move in three-dimensional space and positioned in a desired location (e.g., near a target panel).

In some examples, the control module 202 may be employed to actuate the robot arm 204 by controlling movement of the actuators 228, 230, 232. In such examples, the actuators 228, 230, 232 may be controlled based on feedback from one or more location sensors positioned adjacent to the end 218 of the robot arm 204, the end closure 214, a desired panel, etc. In other examples, the actuators 228, 230, 232 may be controlled based on user input, such as a set location input, directional inputs, etc.

Additionally, the control module 202 may be employed to actuate the movable base 238. For example, the control module 202 may control movement of the wheels 240 to move the base 238 to a desired position. In turn, the robot arm 204 (and more specifically, the end closure 214) may be positioned in a desired location (e.g., near a target panel of the vehicle). In such examples, the wheels 240 may be controlled based on feedback from one or more location sensors and/or user input (e.g., a set location input, directional inputs, etc.).

The control module 202 may also control movement of the lamp holder or another suitable structure in the lamp assembly 206. For example, the control module 202 may actuate (e.g., manipulate, rotate, move, etc.) the lamp holder. In doing so, the control module 202 may cause one or more selected UV lamps of the lamp assembly 206 to be positioned near and in communication with the open end of the optical cable 212 at the end 216 of the robot arm 204, as explained herein. In such examples, control of the lamp holder may be based on feedback from one or more sensors near the lamp holder and/or user input (e.g., one or more set UV lamps, etc.).

Then, the control module 202 may control the selected UV lamp(s) of the lamp assembly 206 to transmit UV light through the optical cable 212 to cure paint on a target panel. For example, once the selected UV lamp(s) of the lamp assembly 206 are positioned near the open end of the optical cable 212, the control module 202 may turn on (e.g., activate) the selected UV lamp(s) to shine UV light into the open end of the optical cable 212. In such examples, the control module 202 may control one or more switching devices to provide power to the selected UV lamp(s), thereby turning on the selected UV lamp(s).

In various embodiments, the control module 202 may control the selected UV lamp(s) of the lamp assembly 206 to turn off. For example, the control module 202 may set a UV light exposure time (e.g., a duration of time) for providing UV light to the target panel. Once the UV light exposure time is met (e.g., as determined by a timer or the like), the control module 202 may turn off (e.g., deactivate) the selected UV lamp(s). In such examples, the UV light exposure time may be set by user input and/or any other suitable manner.

In some examples, other parameters of the UV lamps of the lamp assembly 206 may be controlled, such as a frequency of the UV lamps, an intensity of the UV lamps, etc. For example, the control module 202 may adjust an output intensity of the selected UV lamp(s) to achieve a target intensity at the panel. In such examples, the control module 202 may adjust the intensity of the UV lamps by moving the end closure 214 closer to and/or further away from the panel (e.g., via the actuators 228, 230, 232 and/or the movable base 238 as explained above). In other examples, the control module 202 may control one or more dimmers for changing the intensity of the UV lamps as desired.

Additionally, in some examples, the control module 202 may adjust the wavelengths of the UV lamps. For example, the control module 202 may change a frequency of a selected UV lamp, which in turn adjusts the light output wavelength of that lamp. As such, the system 200 may enable transmission of UV light in various wavelengths and/or intensities for curing UV paint having different depths or pigments.

The lamp assembly 206 of FIG. 2 may include various components, such as one or more lens, mirrors, etc. for focusing (or defocusing), redirecting, etc. UV light provided by the UV lamps. As examples only, FIGS. 3-5 depict two lamp assemblies 306, 506 that may be employed in the system 200 of FIG. 2 (and the system 100 of FIG. 1).

Figure 3:
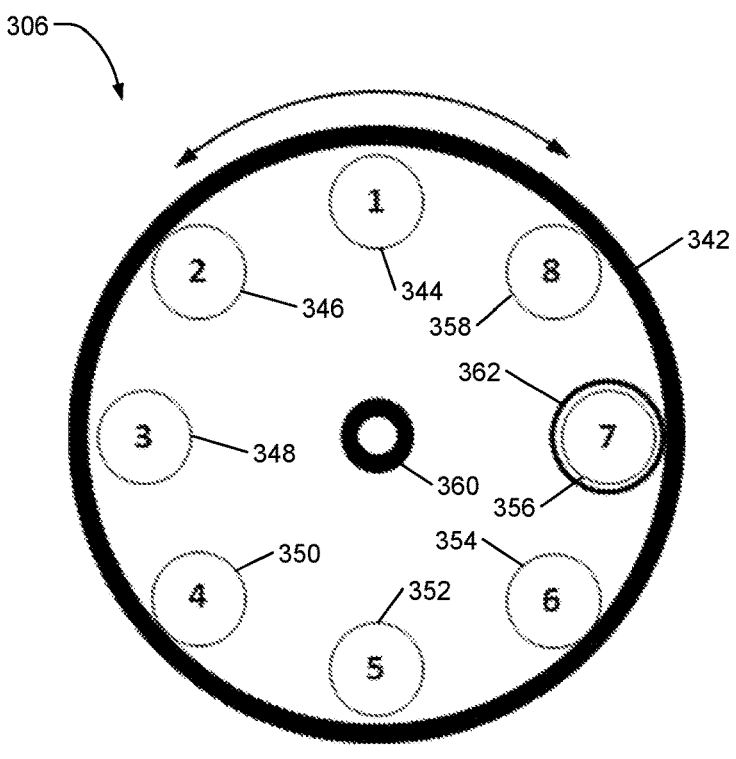
FIG. 3 is a front view of an example lamp assembly employable in the robotic systems of FIGS. 1-2 according to the present disclosure.
Figure 4:
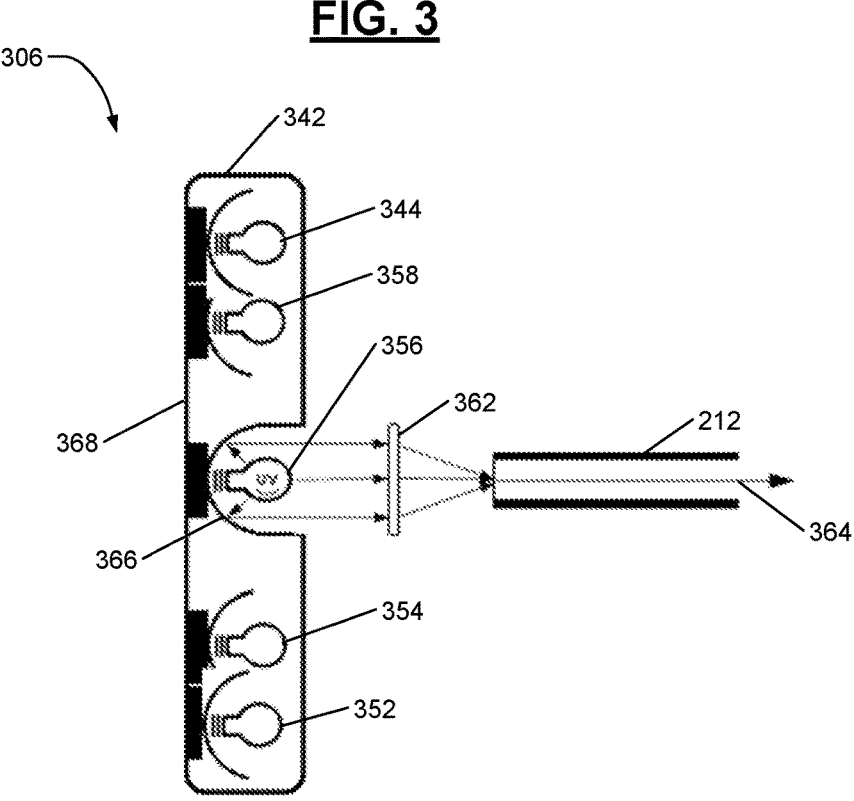
FIG. 4 is a side view of the lamp assembly of FIG. 3 according to the present disclosure.
Figure 5:
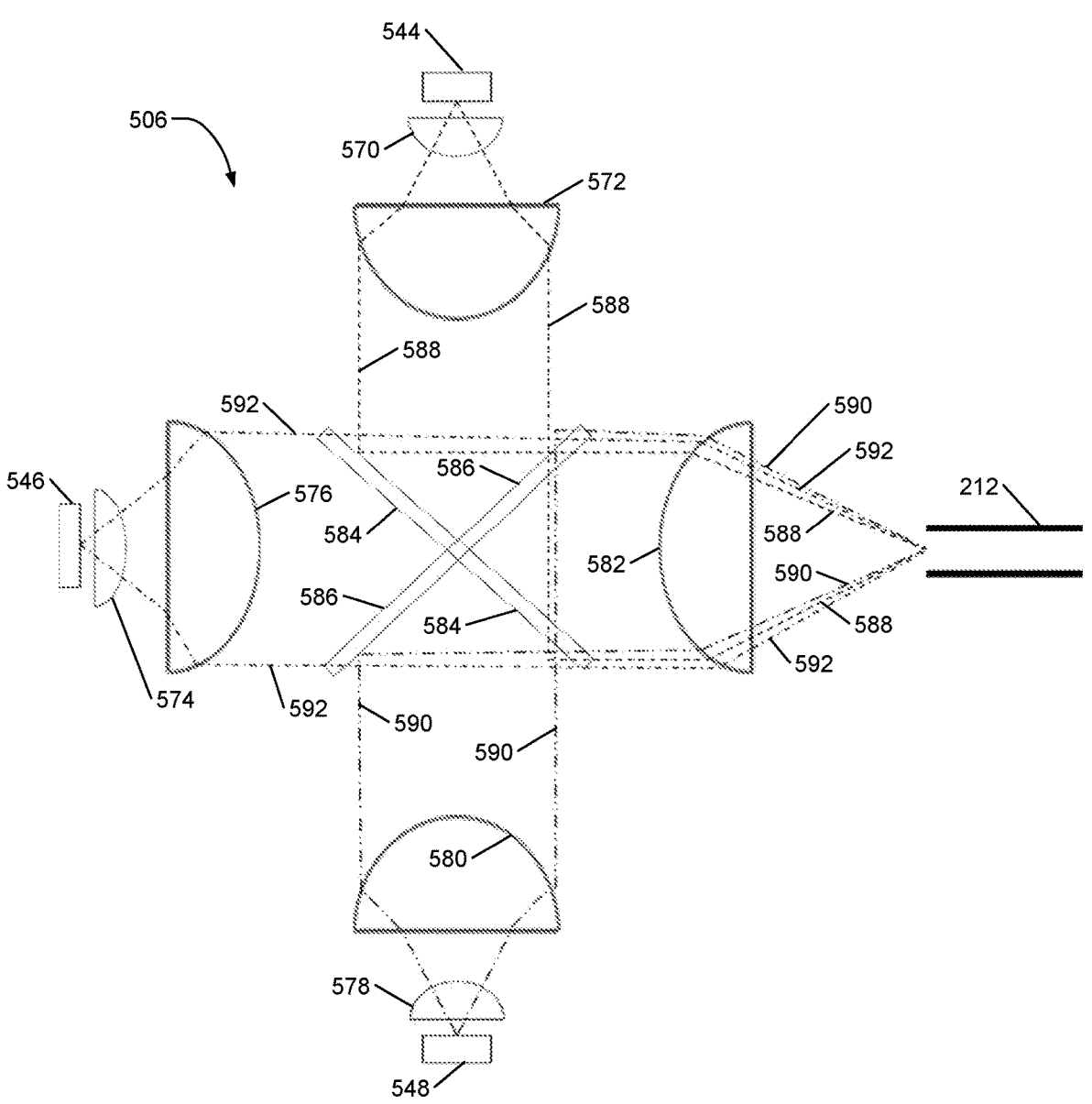
FIG. 5 is a front view of another example lamp assembly employable in the robotic systems of FIGS. 1-2 according to the present disclosure.

For example, the lamp assembly 306 of FIGS. 3-4 generally includes a lamp holder 342 and eight UV lamps 344, 346, 348, 350, 352, 354, 356, 358. In the example of FIGS. 3-4, the lamp holder 342 is a wheel (or a disk) with an outer circumference, and the UV lamps 344, 346, 348, 350, 352, 354, 356, 358 are disposed along the outer circumference of the wheel. While the lamp assembly 306 is shown as including eight UV lamps 344, 346, 348, 350, 352, 354, 356, 358 arranged in a specific configuration around the outer circumference of the wheel, it should be appreciated that more or less UV lamps may be employed and/or the UV lamps may be arranged differently if desired.

In the example of FIGS. 3-4, the lamp holder 342 is rotatable about a central axis 360. In such examples, the lamp holder 342 (e.g., the wheel) may be controlled to rotate by a control module (e.g., the control module 102, 202 of FIGS. 1-2) and/or manually controlled by one or more individuals as explained herein. For example, the control module may control rotation of the wheel and position one or more of the UV lamps 344, 346, 348, 350, 352, 354, 356, 358 near and in communication with an open end of an optical cable (e.g., the optical cable 212 as shown in FIG. 4). Specifically, with reference to FIGS. 3-4, the wheel is rotated in a manner to position the UV lamp 356 near and in communication with the open end of the optical cable 212.

In various embodiments, the lamp assembly 306 may include other optional components, such as one or more mirrors and/or lens. For example, in FIGS. 3-4, the lamp assembly 306 includes a lens 362 disposed between the UV lamp 356 and the optical cable 212. In such examples, the lens 362 focuses UV light (e.g., radiation) from the UV lamp 356 into a beam 364 that travels through the optical cable 212. In the example of FIGS. 3-4, the lens 362 may be in a fixed location. As such, when the wheel is rotated, a new UV lamp 344, 346, 348, 350, 352, 354, 358 may be positioned adjacent to the lens 362. In other examples, the lamp assembly 306 may include a mirror (e.g., a one-way mirror, etc.) instead of the lens 362 if desired.

Additionally, and as shown in FIGS. 3-4, each UV lamp 344, 346, 348, 350, 352, 354, 356, 358 includes a mirror positioned between the UV lamp and the lamp holder 342. For example, the lamp assembly 306 includes a curved mirror 366 positioned between the UV lamp 356 and a support wall 368 of the lamp holder 342. In such examples, some of the UV light transmitted by the UV lamp 356 may be redirected (e.g., reflected, etc.) by the mirror 366 towards the optical cable 212, as shown in FIG. 4. The other UV lamps 344, 346, 348, 350, 352, 354, 358 may include similarly arranged mirrors as the mirror 366, as shown in FIG. 4.

In the example of FIGS. 3-4, each UV lamp 344, 346, 348, 350, 352, 354, 356, 358 may be any suitable UV light. For example, any one of the UV lamps 344, 346, 348, 350, 352, 354, 356, 358 may include a UV LED light. Additionally, in some examples, any one of the UV lamps 344, 346, 348, 350, 352, 354, 356, 358 may include multiple UV lights (e.g., multiple bulbs), such as multiple UV LED lights if desired. In various embodiments, the UV lamps 344, 346, 348, 350, 352, 354, 356, 358 may have the same or different light output wavelengths and/or the same or different light intensities. For example, some of the UV lamps 344, 346, 348, 350, 352, 354, 356, 358 may have a UV-A light while others may have a UV-B light or a UV-C light. In other examples, the UV lamps 344, 346, 348, 350, 352, 354, 356, 358 may include a combination of two or more of UV-A, UV-B, and UV-C lights. The different UV light wavelengths may be used to cure different types of paint. For example, a primer may be cured using UV-C lights, while another paint may be cured using UV-A and/or UV-B lights.

With reference to FIG. 5, the lamp assembly 506 generally includes three UV lamps 544, 546, 548 and multiple lens and mirrors. The UV lamps 544, 546, 548 may be generally ninety radial degrees away from each other relative to a common center point between the lamps 544, 546, 548. For example, each UV lamp 544, 548 may be about ninety radial degrees away from the UV lamp 546. While the lamp assembly 506 is shown as including three UV lamps 544, 546, 548 arranged in a specific configuration, it should be appreciated that more or less UV lamps may be employed and/or the UV lamps may be arranged differently if desired.

Additionally, while not shown, the lamp assembly 506 may include a lamp holder or another suitable structure for supporting the UV lamps 544, 546, 548, the lens and the mirrors if desired. In such examples, the lamp holder may be substantially fixed (e.g., stationary).

In the example of FIG. 5, the UV lamps 544, 546, 548 may be similar to the UV lamps 344, 346, 348, 350, 352, 354, 356, 358 of FIGS. 3-4. For instance, the UV lamps 544, 546, 548 may include one or more UV lights (e.g., bulbs), such as one or more UV LED lights. Additionally, the UV lamps 544, 546, 548 may have the same or different light output wavelengths and/or the same or different light intensities. For example, in some embodiments, the UV lamp 544 may be a UV-A LED lamp having a wavelength ranging from about 315 nm to about 400 nm, the UV lamp 546 may be a UV-B LED lamp having a wavelength ranging from about 280 nm to about 315 nm, and the UV lamp 548 may be a UV-C LED lamp having a wavelength ranging from about 100 nm to about 280 nm. As such, in this example, the UV lamps 544, 546, 548 may cover three different wavelengths of the UV spectrum.

Each of the UV lamps 544, 546, 548 can be independently turned on and/or off by a control module, such as the control module 102, 202 of FIGS. 1-2 as explained herein. As such, only one of the UV lamps 544, 546, 548 or a combination of the UV lamps 544, 546, 548 may activated at a time. For example, the UV lamps 544, 546 may be activated at the same time or a partially overlapping time while the UV lamp 548 may be deactivated. In other examples, only the UV lamp 548 may be activated. With such configurations, the lamp assembly 506 may provide UV light from one UV lamp having a specific wavelength or UV light from a combination of the UV lamps 544, 546, 548 having different wavelengths to an open end of an optical cable (e.g., the optical cable 212 as shown in FIG. 5).

As mentioned above, the lamp assembly 506 includes multiple lens and mirrors. Specifically, in FIG. 5, the lamp assembly 506 includes seven lens 570, 572, 574, 576, 578, 580, 582, and two one-way mirrors 584, 586. As shown in FIG. 5, the lens 570, 572, 574, 576, 578, 580 are disposed between the UV lamps 544, 546, 548 and the optical cable 212. More specifically, the lens 570, 572 are disposed between the UV lamp 544 and the optical cable 212, the lens 574, 576 are disposed between the UV lamp 546 and the optical cable 212, and the lens 578, 580 are disposed between the UV lamp 548 and the optical cable 212. Additionally, the lens 582 is disposed between the one-way mirrors 584, 586 and the optical cable 212, and the one-way mirrors 584, 586 are disposed between lens 570, 572, 574, 576, 578, 580, 582. While the lamp assembly 506 of FIG. 5 is shown as including seven lens and two one-way mirrors arranged in a specific configuration, it should be appreciated that more or less lens and/or mirrors may be employed and/or arranged differently if desired.

In the example of FIG. 5, UV light from the UV lamps 544, 546, 548 passes through the appropriate lens 570, 572, 574, 576, 578, 580, 582 and at least one of the one-way mirrors 584, 586. The one-way mirrors 584, 586 are made in such a way that UV light coming from the front is reflected back but light coming from the back side can pass through as if it is transparent. For example, UV light 588 from the UV lamp 544 (e.g., a UV-A LED light) is shown with a dashed line configuration. As shown, the UV light 588 passes through the lens 570, 572 (e.g., divergent lens) and hits the one-way mirror 584. The UV light 588 is then reflected 90 degrees from the one-way mirror 584 and passes through the one-way mirror 586 to the lens 582 (e.g., a convergent lens), where the UV light 588 is focused to reach the inlet of the optic cable 212. Similarly, UV light 590 from the UV lamp 548 (e.g., a UV-C LED light) is shown with a dash-dot-dot-dash line configuration. The UV light 590 passes through the lens 578, 590 (e.g., divergent lens) and hits the one-way mirror 586. The UV light 590 is then reflected 90 degrees from the one-way mirror 586 and passes through the one-way mirror 584 to the lens 582, where the UV light 590 is focused to reach the optic cable 212. Additionally, UV light 592 from the UV lamp 546 (e.g., a UV-B LED light) is shown with a dash-dot-dash line configuration. The UV light 592 passes through the lens 574, 576 (e.g., divergent lens) and passes through the one-way mirrors 584, 586 to the lens 582, where the UV light 592 is focused to reach the optic cable 212.

Figure 6:
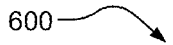
FIG. 6 is a flowchart of an example control process for controlling a robotic system to cure paint on a panel of a vehicle according to the present disclosure.
Figure 6:
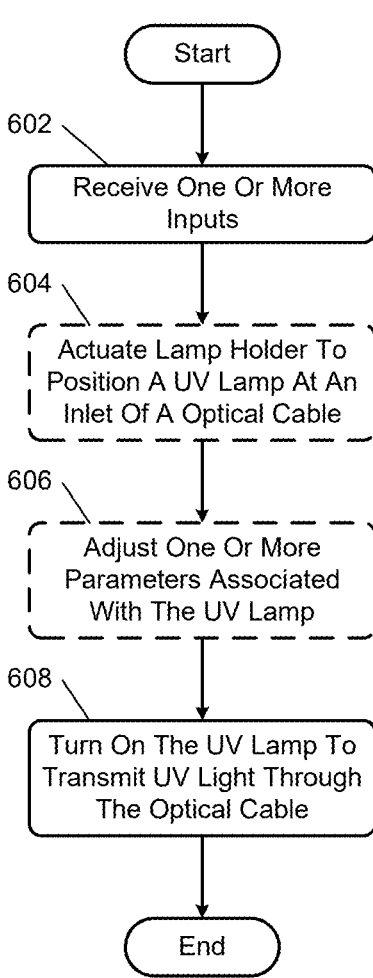

FIG. 6 illustrates an example control process 600 employable by the control module 202 of FIG. 2 for curing paint on one or more panels of a vehicle and/or another suitable object. Although the example control process 600 is described in relation to the robotic system 200 of FIG. 2 including the control module 202, the control process 600 may be employable by any suitable system.

As shown in FIG. 6, control begins at 602 where the control module 202 receives one or more inputs. For example, and as explained above, the control module 202 may receive feedback from one or more sensors and/or user input regarding a position of the robot arm 204, the end closure 214, the base 238, the target panel, the lamp holder (e.g., the lamp holder 342 of FIG. 3). Additionally, in some examples, the control module 202 may receive user input regarding a target UV light exposure time, a target light output wavelength, a target light intensity, etc. Control then proceeds to 604.

At 604, the control module 202 may optionally actuate the lamp holder to position one or more UV lamps of the lamp assembly 206 at an inlet of the optical cable 212. For example, if the lamp assembly 206 includes a movable lamp holder (e.g., the lamp holder 342 of FIG. 3), the control module 202 may rotate the lamp holder until one or more desired UV lamps are positioned near the inlet of the optical cable 212. In such examples, the control module 202 may identify the desired UV lamp(s) based on the received input at 602. In other examples, the lamp holder may be manually rotated if desired. Control then proceeds to 606.

At 606, the control module 202 may optionally adjust one or more parameters associated with the UV lamp(s) positioned near the inlet of the optical cable 212. For example, and as explained above, the control module 202 may adjust a light output wavelength, a light intensity, etc. of the UV lamp(s) by changing a frequency of the UV lamp, changing a distance between the end closure 214 and the target panel, etc. In such examples, the control module 202 may adjust the light output wavelength, the light intensity, etc. of the UV lamp(s) based on the received input at 602. Control then proceeds to 608.

At 608, the control module 202 turns on the UV lamp(s) positioned near the inlet of the optical cable 212. In doing so, UV light is transmitted from the UV lamp(s) through the optical cable 212 for curing paint. The control module 202 may keep the UV lamp(s) on until a target UV light exposure time is met. Once the exposure time is met, the control module 202 may turn off the UV lamp(s). Control may then end as shown in FIG. 6 or return to 602 if desired.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A robotic system comprising:
a robot arm including a first end and a second end opposing the first end;
an optical cable extending between the first end and the second end of the robot arm;
a lamp assembly disposed at the second end of the robot arm, the lamp assembly including a lamp holder having a wheel with an outer circumference and a plurality of ultraviolet (UV) lamps disposed along the outer circumference of the wheel and configured to cure paint; and
a control module configured to:
actuate the lamp holder and position one or more selected UV lamps of the plurality of UV lamps in communication with an end of the optical cable; and
turn on the one or more selected UV lamps to transmit UV light through the optical cable to cure paint on a panel of a vehicle.

2. The robotic system of claim 1, wherein the control module is configured to rotate the wheel and position the one or more selected UV lamps in communication with the end of the optical cable.

3. The robotic system of claim 1, wherein the plurality of UV lamps includes eight UV lamps disposed along the outer circumference of the wheel.

4. The robotic system of claim 1, wherein the lamp assembly includes a mirror or a lens disposed between the one or more selected UV lamps and the optical cable.

5. The robotic system of claim 1, wherein the lamp assembly includes one or more mirrors and one or more lens disposed between the one or more selected UV lamps and the optical cable.

6. The robotic system of claim 5, wherein the one or more mirrors include a one-way mirror.

7. The robotic system of claim 1, further comprising an end closure disposed at the first end of the robot arm, the end closure configured to adjust the UV light from the one or more selected UV lamps.

8. The robotic system of claim 7, wherein:

the end closure includes at least one glass lens configured to focus the UV light from the one or more selected UV lamps; and the optical cable is configured to transmit the UV light from the one or more selected UV lamps to the at least one glass lens in the end closure.

9. The robotic system of claim 1, wherein each of the plurality of UV lamps have a different light output wavelength.

10. The robotic system of claim 1, wherein the plurality of UV lamps includes UV LED lamps.

11. The robotic system of claim 1, wherein the control module is configured to actuate the robot arm and position the first end of the robot arm relative to the panel of the vehicle.

12. The robotic system of claim 1, further comprising a movable base disposed under the robot arm and wherein the control module is configured to actuate the movable base and position the robot arm relative to the panel of the vehicle.

13. The robotic system of claim 1, wherein the control module is configured to set a UV light exposure time and turn off the one or more selected UV lamps when the UV light exposure time is met.

14. A robotic system comprising:

a robot arm including a first end, a second end opposing the first end;

an optical cable extending between the first end and the second end of the robot arm;

a lamp assembly disposed at the second end of the robot arm, the lamp assembly including a plurality of ultraviolet (UV) lamps configured to cure paint, at least one one-way mirror disposed between the plurality of UV lamps, and a lens disposed between each UV lamp of the plurality UV lamps and the one-way mirror; and a control module configured to turn on one or more selected UV lamps of the plurality UV lamps to transmit UV light through the lens disposed between the one or more selected UV lamps and the one-way mirror, through the one-way mirror, and through the optical cable to cure paint on a panel of a vehicle.

15. The robotic system of claim 14, wherein the plurality of UV lamps includes a UV-A LED lamp, a UV-B LED lamp, and a UV-C LED lamp.

16. The robotic system of claim 14, wherein:

the lens disposed between each UV lamp of the plurality of UV lamps are first lens; and the lamp assembly includes at least one second lens disposed between the one-way mirror and an end of the optical cable.

17. The robotic system of claim 14, further comprising an end closure disposed at the first end of the robot arm, wherein:

the end closure includes at least one glass lens configured to focus the UV light from the one or more selected UV lamps; and the optical cable is configured to transmit the UV light from the one or more selected UV lamps to the at least one glass lens in the end closure.

18. The robotic system of claim 14, wherein the control module is configured to actuate the robot arm and position the first end of the robot arm relative to the panel of the vehicle.

19. The robotic system of claim 14, further comprising a movable base disposed under the robot arm and wherein the control module is configured to actuate the movable base and position the robot arm relative to the panel of the vehicle.

20. A robotic system comprising:

a robot arm including a first end and a second end opposing the first end;

an optical cable extending between the first end and the second end of the robot arm;

a lamp assembly disposed at the second end of the robot arm, the lamp assembly including a lamp holder having a wheel with an outer circumference and a plurality of ultraviolet (UV) lamps disposed along the outer circumference of the wheel and configured to cure paint; and a control module configured to:

rotate the wheel and position one or more selected UV lamps of the plurality of UV lamps in communication with an end of the optical cable; and turn on the one or more selected UV lamps to transmit UV light through the optical cable to cure paint on a panel of a vehicle, wherein the lamp assembly includes one or more one-way mirrors disposed between the one or more selected UV lamps and the optical cable.

* * * * *